(12) United States Patent
Shevade

(10) Patent No.: US 12,723,948 B2
(45) Date of Patent: Sep. 1, 2026

(54) DEVICE FOR MEASURING GEAR PARAMETERS WITH MANUAL GEAR ROLL TESTER

(71) Applicant: Sudhanshu Shevade, Aurangabad (IN)

(72) Inventor: Sudhanshu Shevade, Aurangabad (IN)

( * ) Notice: Subject to any disclaimer, the term of this patent is extended or adjusted under 35 U.S.C. 154(b) by 279 days.

(21) Appl. No.: 18/710,963

(22) PCT Filed: Nov. 15, 2022

(86) PCT No.: PCT/IN2022/051002
§ 371 (c)(1),
(2) Date: May 16, 2024

(87) PCT Pub. No.: WO2023/089630
PCT Pub. Date: May 25, 2023

(65) Prior Publication Data

US 2025/0027841 A1 Jan. 23, 2025

(30) Foreign Application Priority Data

Nov. 16, 2021 (IN) ............................ 202121052469

(51) Int. Cl.
*G01M 13/00* (2019.01)
*G01M 13/021* (2019.01)

(52) U.S. Cl.
CPC ................................ *G01M 13/021* (2013.01)

(58) Field of Classification Search
CPC .................................................. G01M 13/021
See application file for complete search history.

(56) References Cited

U.S. PATENT DOCUMENTS 6,507,789 B1 * 1/2003 Reddy ................ G01M 13/021
702/34

FOREIGN PATENT DOCUMENTS

| | | | | | |
|---|---|---|---|---|---|
| CN | 201382853 | Y | * | 1/2010 | |
| CN | 212134060 | U | * | 12/2020 | |
| JP | 58155310 | A | * | 9/1983 | B23F 23/10 |
| KR | 101299951 | B1 | * | 8/2013 | G01M 13/02 |

* cited by examiner

*Primary Examiner* — Francis C Gray
(74) *Attorney, Agent, or Firm* — Maschoff Brennan

(57) ABSTRACT

A device for measuring gear parameters with manual gear roll tester (100) hereinafter referred as "device 100" is described. The device (100) is removably connectable to a gear roll tester (104). The device (100) includes a control unit (108), an input device (112) and an output device (116). The control unit (108) is configured to receive the outputs of the gear roll tester (104) and processing these outputs. The input device (112) for example a probe is configured according to the present invention and connected with the gear roll tester (104). The output of gear roll tester (104) is input for the input device (112). The control unit (108) includes a first processing unit (204) and a second processing unit (208).

13 Claims, 8 Drawing Sheets

DEVICE FOR MEASURING GEAR PARAMETERS WITH MANUAL GEAR ROLL TESTER

FIELD OF THE INVENTION

The present invention relates to a device for measuring gear parameters with manual gear roll tester and more particularly to a device that is universally adaptable with existing gear roll testers.

BACKGROUND OF THE INVENTION

Rapid development and technological innovations have significantly increased manufacturing and production of various parts and products. Mechanical components like gears, bolts, nuts, etc. are no exception to this. Over the past decade manufacturing in India has grown by approximately 4% per year. However with the increase in manufacturing and advancements in manufacturing technologies, quality control of products has become imperative.

Quality is an important factor for any product or service. Quality control of products is necessary to ensure that product quality is either maintained or improved. Quality control in manufacturing is performed to review the quality and products to identify and eliminate defects. Gear manufacturers conduct tests on the manufactured gears as gears having errors produce noise and vibrations and are highly unacceptable.

Many manufactures in the prior art conduct a test for quality control purposes using Manual gear roll tester machines present in the prior art. The tests are manually conducted by an operator and require extreme concentration. The drawback of this type of machines is that the tests are tiring for the operator and slow. Another drawback of this type of machines due to human error faulty gears are passed that might cause failures and accidents in the future.

U.S. Pat. No. 3,680,373A discloses a gear testing device. The patent teaches use of a planetary type gear testing unit having carrier construction connected to ground and to a test load to load the gearing of the unit to condition the unit for a gear fatigue test operation. The drawback of this type of device is unable to perform composite error tests and deviation tests for gears. Another drawback of this type of machine is that the machine is human operated increasing the possibility of errors due to lack of concentration or judgment from the operator.

There is a need of a device for measuring gear parameters with gear roll tester. Further there is a need of a device for measuring gear parameters that is universally adaptable with existing gear roll testers.

SUMMARY OF INVENTION

A device for measuring gear parameters with manual gear roll tester removably connected to a gear roll tester includes a control unit includes a first processing unit and a second processing unit configured for operating the device 100, an input device further includes a probe configured for detecting gear meshing and producing relative deflection.

The first processing module includes a signal conditioner, an amplifier and an interface module. The second processing module includes a controller configured for processing inputs, a continuous monitoring module configured for dynamic operation, a displacement detection module configured to detect fluctuations in the probe for detecting status of the device, a database, a machine setting module configured for using upper and lower value limit samples for determining center distance between gears, a probe setting module configured for tuning the probe, a memory chip and a random access memory (RAM). The device has a first manual mode of operation, and a second automatic mode of operation for measuring and providing gear parameters.

The first processing unit is configured for conditioning and amplifying input received from the input device, and the second processing unit is configured for monitoring, processing inputs and displaying gear parameters, statistics and graphical analysis on an output device. The signal conditioner is configured for converting probe deflections into analogue signals. The amplifier is configured to amplify the analogue signals. The interface module configures the signal conditioner and the amplifier, and coordinates between the signal conditioner and the amplifier.

The continuous monitoring module is configured for dynamic operation and continuous monitoring of the device. The machine setting module is configured for determining center distance between the master gear and the testing gear. The probe setting module is configured for tuning the probe. The output device includes a configured display having a user interface for graphically representing gear testing results and a speaker for providing instructions to an operator. The user interface further includes a dial defined by a dynamic display displaying range of a gear parameter.

The automatic mode of operation includes steps of initiating the continuous monitoring module, continuously monitoring and detecting displacement signals from the probe, prompting user to start gear testing by producing visual and audio output, starting testing cycle after receiving signals from the displacement detection module, converting deflection into analogue signals and amplifying the signals, processing the signals and calculating gear parameters, displaying the parameters on the user interface 400 and announcing decision of gear test.

A process of configuring the probe includes steps of positioning the probe on a calibration stand, mounting a lower value slip gauge on a mounting block, opening probe scaling option in the probe setting module, inputting reading value of the first slip gauge, recording relative digital output of the first slip gauge by the probe setting module, mounting a second slip gauge of higher vale on the mounting block, inputting reading value of the second slip gauge, recording relative digital output of the first second gauge by the probe setting module, automatic deriving scaling factor for the probe using the gauge inputs, prompting the user to mount the probe on the mounting block, pre-loading the probe according to the derived scaling factor.

BRIEF DESCRIPTION OF THE DRAWINGS

The objectives and advantages of the present invention will become apparent from the following description read in accordance with the accompanying drawings wherein.

DETAILED DESCRIPTION OF THE INVENTION

The invention described herein is explained using specific exemplary details for better understanding. However, the invention disclosed can be worked on by a person skilled in the art without the use of these specific details.

References in the specification to "one embodiment" or "an embodiment" means that particular feature, structure, characteristic, or function described in connection with the embodiment is included in at least one embodiment of the invention. The appearances of the phrase "in one embodiment" in various places in the specification are not necessarily all referring to the same embodiment.

References in the specification to "preferred embodiment" means that a particular feature, structure, characteristic or function described in detail thereby omitting known constructions and functions for clear description of the present invention.

The foregoing description of specific embodiments of the present invention has been presented for purposes of illustration and description. They are not intended to be exhaustive or to limit the present invention to the precise forms disclosed, and obviously many modifications and variations are possible in light of the above teaching.

In general aspect, the present invention is device for measuring gear parameters with manual gear roll tester that is universally adaptable with existing gear roll testers.

Figure 1:
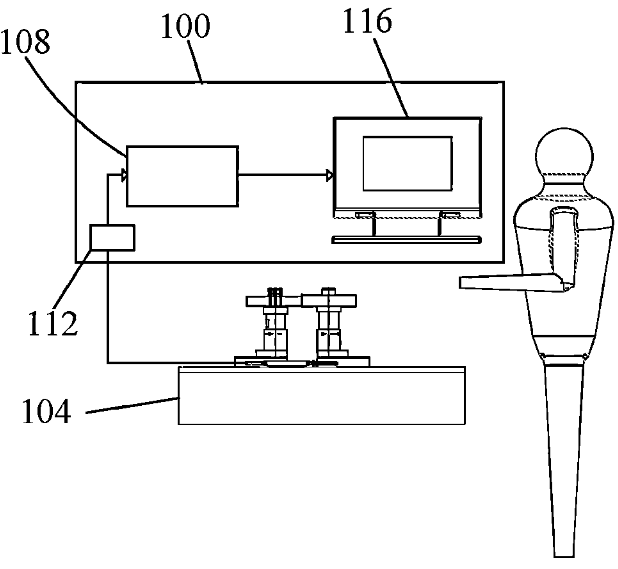
FIG. 1 shows a device for measuring gear parameters with a manual gear roll tester 100 in accordance with a preferred embodiment of the present invention.

FIG. 1 shows a device for measuring gear parameters with manual gear roll tester 100 of the present invention hereinafter referred as "device 100" that is removably connectable to a gear roll tester 104. In accordance with the present invention, the device 100 includes a control unit 108, an input device 112 and an output device 116. The gear roll tester 104 is preferably a manual gear roll testers known in the art. The gear roll tester 104 is used for measuring various gear parameters by manually mounting a gear and taking readings from a dial gauge.

The control unit 108 is configured to receive the outputs of the gear roll tester 104 and processing these outputs. The input device 112 for example a probe is configured according to the present invention and connected with the gear roll tester 104. The output of gear roll tester 104 is input for the input device 112. Various parameters of the gear such as Total Composite Error (TCE), Tooth to Tooth Composite Error (TTE), Pitch Circle Diameter (PCD) run-out of a gear, attribute span and the like are detected by the input device 112, processed by the control unit 108 and displayed by the output device 116 preferably a display. The output device 116 also includes an audio device preferably a speaker providing audio based outputs for example instructions, status and the like to the user.

Figure 2:
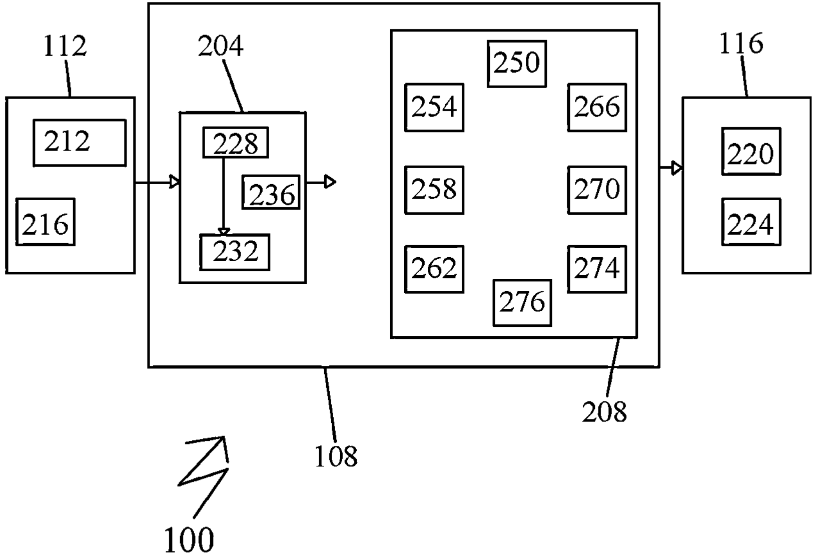
FIG. 2 shows a schematic of the device for measuring gear parameters with gear roll tester 100 of FIG. 1.

Referring to FIG. 2, a schematic of the device 100 is shown. The control unit 108 includes a first processing unit 204 and a second processing unit 208. The input device 112 preferably includes a probe 212 and a key-pad 216. The output device 116 preferably includes a display 220 and a speaker 224. The first processing unit 204 includes a signal conditioner 228, an amplifier 232 and an interface module 236. The signal conditioner 228 is configured to receive inputs from the input device 112 that is preferably relative deflection of the probe 212 and converts them into analogue signal scaled to preferably 0-10V. These analogue signals are received by the amplifier 232. The amplifier 232 is configured to amplify these analogue signals to preferably 16 pulses per micron. The interface module 236 advantageously allows configuration and coordination of the signal conditioner 228 and the amplifier 232.

The second processing unit 208 includes a controller 250, a continuous monitoring module 254, a displacement detection module 258, a database 262, a machine setting module 266, a probe setting module 270, a memory chip 274 and a RAM 276. The controller 250 is configured for monitoring readings, determining status of the roll tester 104, processing i.e. indexing and trimming of the readings, calculation of readings and final decision of gear.

The continuous monitoring module 254 is configured for dynamic operation and continuous monitoring in automatic mode of the device 100. The displacement detection module 258 is advantageously configured to detect fluctuations in the probe 212 for detecting status of the device 100. The machine setting module 266 is configured for using upper and lower value limit samples for determining centre distance between the master gear and the testing gear. The probe setting module 270 is advantageously configured for tuning the probe 212 as per the requirement of the user. The memory chip 274 and the RAM 278 store the preferred calibrations and settings of the components.

Figure 3:
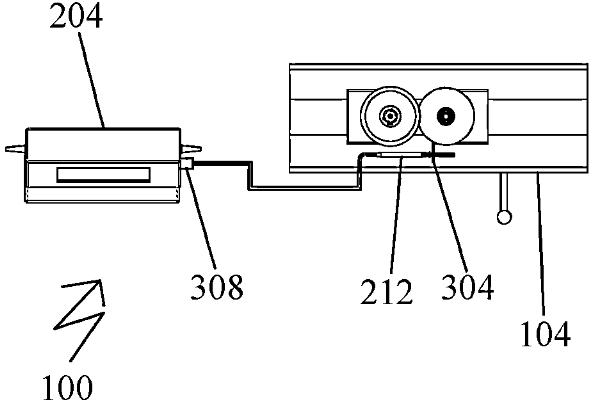
FIG. 3 shows a preferred method of configuration of the input device of the device for measuring gear parameters with gear roll tester 100 of FIG. 1.

Referring to FIG. 3, the device 100 connected to the gear roll tester 104 in accordance with the present invention is discussed. A first end of the probe 212 of the input device 112 is advantageously mounted on a mounting block 304 of the gear roll tester 104 by the user. The probe 212 is mounted and connected on the mounting block 304. A master gear and a testing gear are mounted on the gear roll tester 104. The position of the probe is aligned with the measurement center of the gear roll tester 104. A pin 308 positioned on the second end of the probe 112 is connected to the first processing unit 204. It is to be noted that the testing gear is a helical gear, spur gear and the like.

Figure 4:
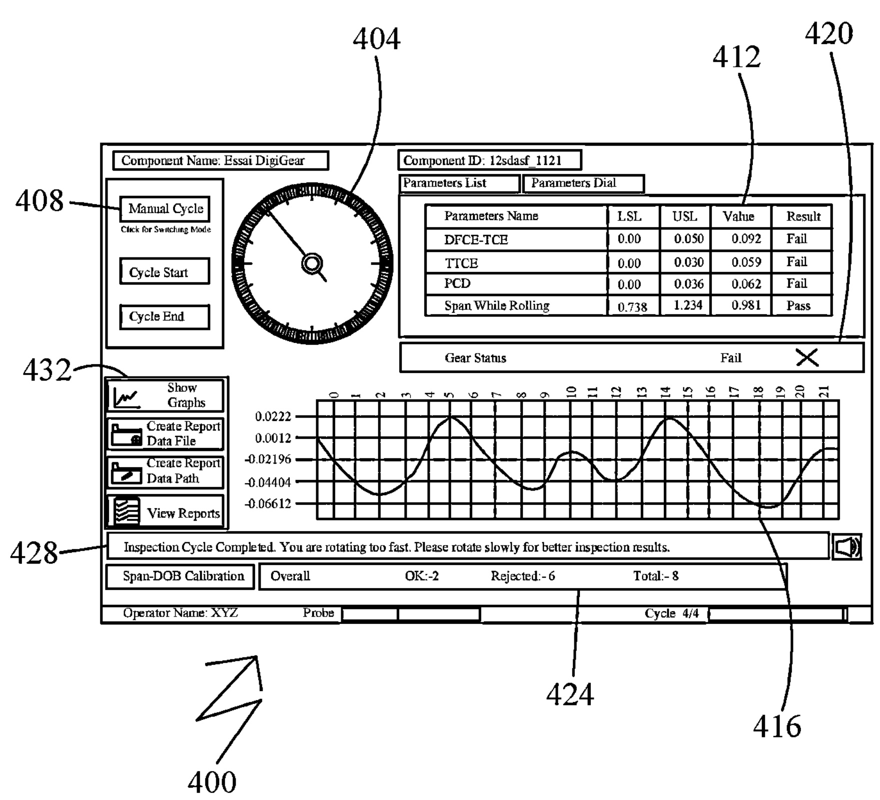
FIG. 4 shows a user interface of the input device of the device for measuring gear parameters with gear roll tester 100 of FIG. 1.

Referring to FIG. 4, a user interface 400 of the device 100 of the present invention is shown. The user interface 400 includes a dial 404, a mode switch 408, a parameter reading table 412, a graph window 416, a result window 420, a statistic window 424, a display bar 428 and a functional window 432. The user interface 400 advantageously facilitates a user to provide inputs to the device 100 and receive testing results, parameters from the device 100.

The dial 404 is a dynamic display window that displays range of the tested parameter preferably the Total Composite Error (TCE) of the testing gear. The mode switch 408 is a pressable tab for switching from manual mode to automatic mode. A user clicks or touches the tab for switching modes of the device 100. The parameter reading table 412 displays the testing gear parameters in a tabular format. The graph window 416 displays the testing gear parameters in a graph format. The result window 420 displays the result of the testing cycle. The statistic window 424 displays the overall statistical analysis of gear testing performed by the device 100. The display bar 428 displays status of spinning characteristics. The functional window 432 includes a plurality of pressable input tabs for showing graphical representation and generating reports.

Steps involved in the continuous monitoring of the operations of the device 100 in accordance with the present invention are described. In a first step, the user selects the automatic mode of the device 100 and the controller 250 activates the continuous monitoring module 254. The continuous monitoring module 254 checks whether the master gear and the testing gear are meshed. If not, a message is displayed on the output device 116 via the controller 250. If the gears are meshed, the continuous monitoring module 254 checks whether the probe is configured and engaged to the gear roll tester 104. If not, a message is displayed on the output device 116 via the controller 250. If the probe is engaged a message to start the testing is displayed. The continuous monitoring module 254 initiates the testing cycle dynamically once the component is rotated by the user. The continuous monitoring module 254 monitors the fluctuations in the probe 212 and signals from the first processing unit 204 to check the speed of gear rolling and corresponding accuracy of results. The continuous monitoring module 254 advantageously monitors all these parameters using inputs from first processing unit 204, probe 212, displacement detection module 258, a machine setting module 266 and a probe setting module 270.

Figure 5:
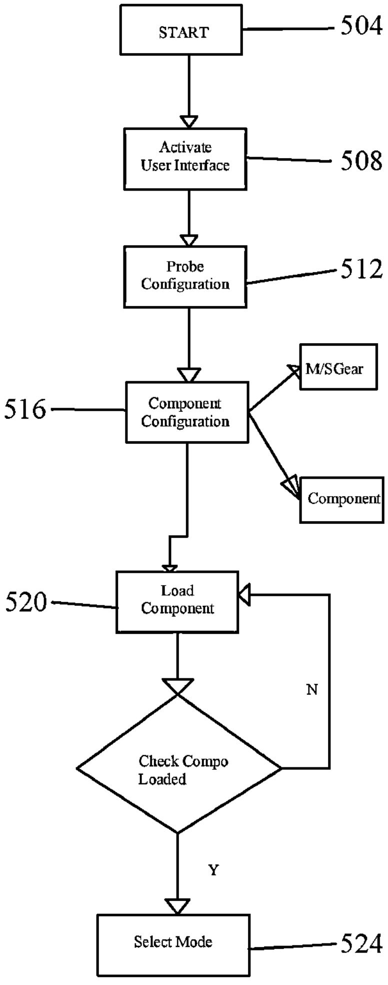
FIG. 5 shows an operational flow-chart of the device 100 of FIG. 1.

Referring to FIG. 5, operational flow chart 500 of the device 100 is described. In a first step 504, the user starts the device 100. In a next step 508, the device 100 activates and displays the user interface 400. In a next step 512, the user sets and configures the probe 212 as per requirement using the probe setting module 270. In a next step 516, the user configures the master gear and the component (test gear) using the machine setting module 266. In a next step 520, the user loads the component on the gear roll tester 104. In a next step 524, the user selects the mode of operation i.e. manual mode or automatic mode.

Figure 5A:
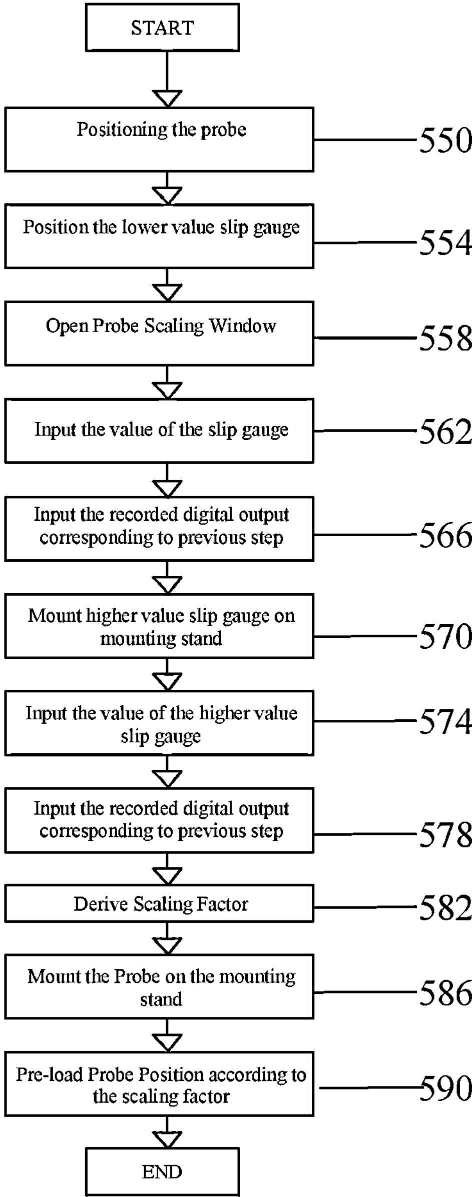
FIG. 5A shows steps involved in configuration of the probe 212 of the device 100 of FIG. 1.

FIG. 5A shows steps involved in configuration of the probe 212. In a first step 550, the user positions the probe 212 on a calibration stand. In a next step 554, the user mounts a lower value slip gauge is on the mounting block 304 of the gear roll tester 104. In a next step 558, the user opens the probe scaling option in the probe setting module 270 of the user interface 400. In a next step 562, the user inputs the reading value of the first slip gauge. In a next step 566, a relative digital output is recorded by the probe setting module 270 for the first slip gauge. In a next step 570, a second slip gauge of higher value is mounted on the mounting block 304 of the gear roll tester 104. In a next step 574, the user inputs the reading value of the second slip gauge. In a next step 578, a relative digital output is recorded by the module 270 for the second slip gauge. In a next step, 582, the probe setting module 270 advantageously derives a scaling factor for the probe 212 using the previously inserted inputs. In a next step 586, the user then mounts the probe 212 on the mounting block 304 of the device 100. In a next step 590, pre-load the probe 212 according to the scaling factor.

Figure 6:
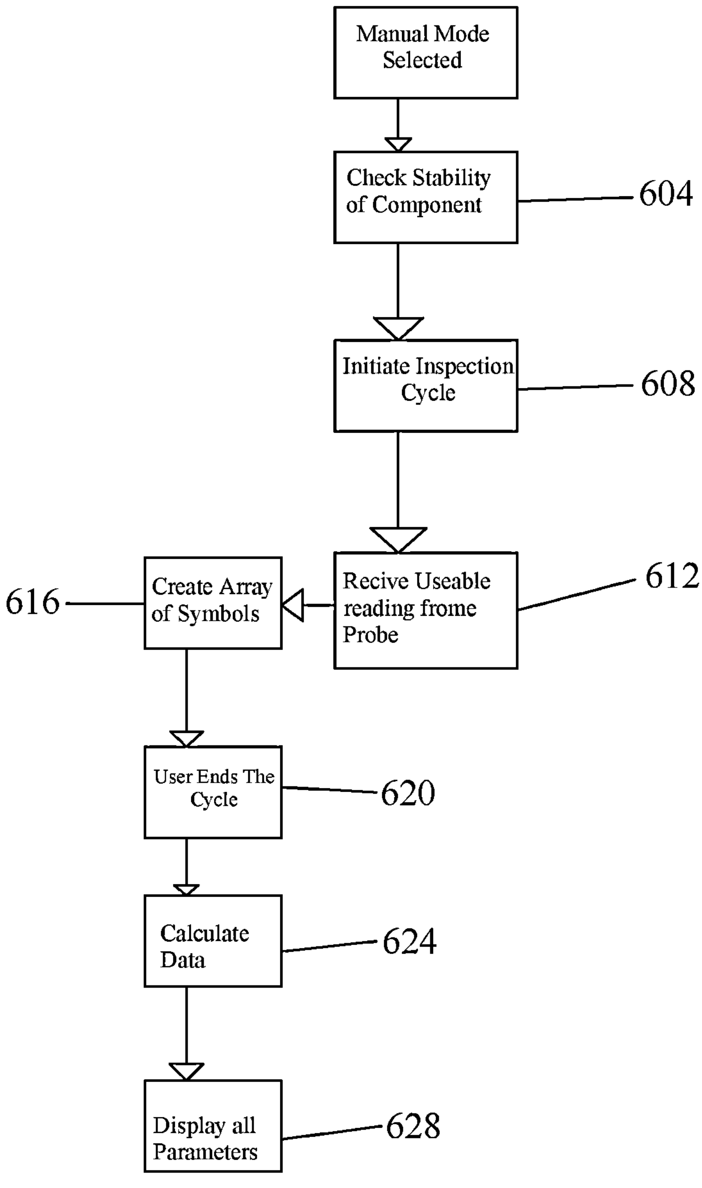
FIG. 6 shows an operational flow chart if the device 100 of FIG. 1 is in manual mode.

Referring to FIG. 6, operational flow chart if manual mode is selected is described. In a first step 604, the device 100 checks the stability of the component. In a next step 608, initiate inspection cycle message is displayed till the user starts rolling of the component. In a next step 612, data received from the probe 212 is processed and analysed by the control unit 108. In a next step 616, the device 100 creates array of symbols using the data. In a next step 620, the stop inspection cycle message is displayed till the user stops rolling the component. In a next step 624, the controller 250 calculates the required parameters using the data. In a final step 628, the calculated parameters are displayed on the display 220 using the user interface 400 and the display bar 428 of the interface 400 displays the decision.

Figure 7:
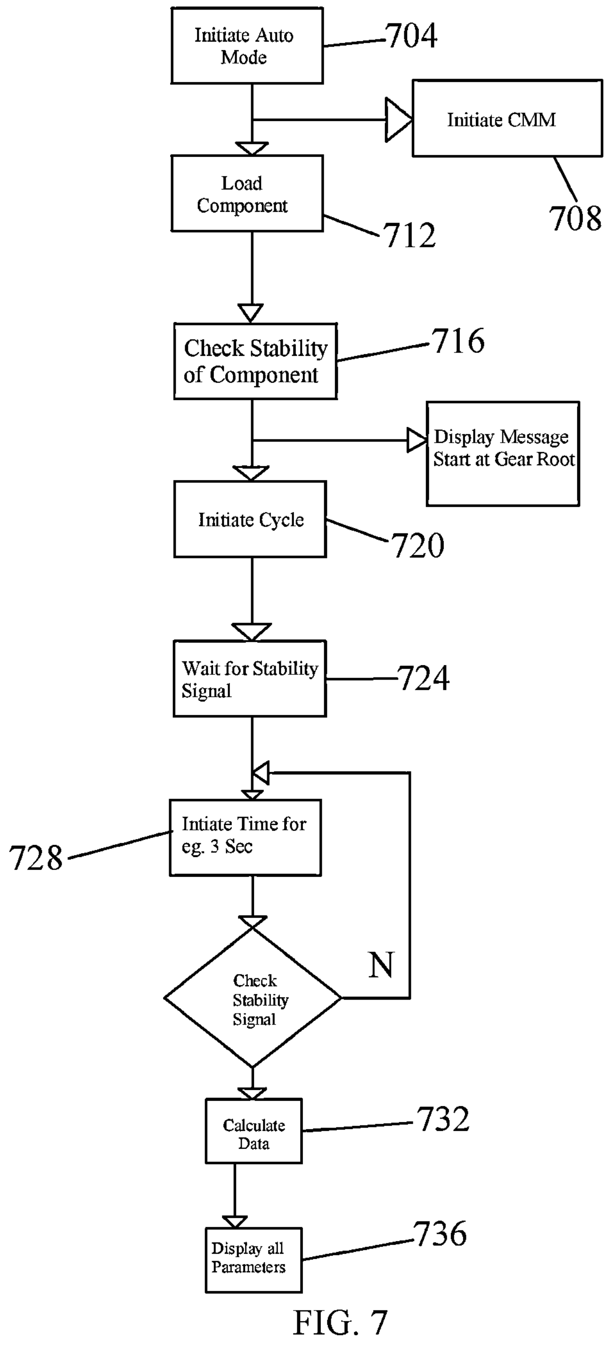
FIG. 7 shows an operational flow chart if the device 100 of FIG. 1 is in automatic mode.

Referring to FIG. 7, an operational flow chart if automatic mode is selected is described. In a first step 704, the device 100 enters automatic mode. In a next step 708, the continuous monitoring module (CMM) 254 is initiated by the device 100. In a next step 712, the user loads the component that is detected by the continuous monitoring module 254. In a next step 716, the continuous monitoring module 254 checks the stability of the component. In a next step 720, the calibration module 712 and the displacement detection module 258 initiate the cycle dynamically once the component is rotated by the user. In a next step 724, the calibration module 712 waits for the stability signal from the displacement detection module 258. In a next step 728, once the stability signal is provided a timer of a pre-defined time preferably 3 seconds starts. In a next step 732, once the timer is completed, the controller 250 calculates the data received from the probe 212. In a next step 736, the calculated parameters are displayed on the display 220 using the user interface 400 and the display bar 428 of the interface 400 displays the decision.

Referring to FIGS. 1-7, the operational cycle of the device 100 for performing a gear testing is described. The testing gear is mounted and meshed with the master gear of the gear roll tester 104. The device 100 is started by pressing a switch. After starting, the probe 212 is calibrated in accordance with the present invention and mounted on the gear roll tester 104. The probe 212 is advantageously calibrated by the probe calibration module 270. The machine setting module 266 determines center distances between the master and the tested gear after mounting of the gears. The user selects the mode of operating i.e. manual mode or automatic mode.

In manual mode, the user intimates the start of testing cycle using a switch on the user interface. The user starts rotating the master gear and the testing gear. The probe 212 produces deflections due to gear meshing. The signal conditioner 228 converts these signals into analogue and the amplifier 232 amplifies the signals. The controller 250 processes these signals by indexing and trimming the readings and calculates the gear parameters. The parameters are displayed on the output device 116 in real time. After completion of the testing cycle, a decision i.e. Pass or Fail on the tested gear is displayed and announced on the output devices 116.

In automatic mode, the continuous monitoring module 254 is initiated by the controller 250. The user is prompted to load the component. The continuous monitoring module 254 continuously checks for signals from the displacement signals converted into analogue from the first processing unit 204. If no signal is received, the user is prompted by the output devices 116 by visual output through the user interface 400 and audio output by activating a pre-recorded message from the database 262 to start gear testing by rotating the master gear and the testing gear. The probe 212 monitors the process of gear meshing and produces deflections in accordance with the gear meshing. The displacement detection module 258 continuously monitors and detects the displacement signals received from the probe 212. Once signals are received, the controller 250 starts the testing cycle. The signal conditioner 228 converts these signals into analogue and the amplifier 232 amplifies the signals. The controller 250 processes these signals by indexing and trimming the readings and calculates the gear parameters. The parameters are displayed on the output device 116 in real time. After completion of the testing cycle, a decision i.e. Pass or Fail on the tested gear is displayed and announced on the output devices 116.

The device for measuring gear parameters with manual gear roll tester 100 is advantageously removably connectable with the gear roll tester 104. The device for measuring gear parameters with manual gear roll tester 100 advantageously measures various gear testing parameters such as Tooth to Tooth Composite Error (TCE), Tooth Composite Error (TTE), Pitch Circle Diameter (PCD) run-out of a gear, attribute span and the like. The device for measuring gear parameters with manual gear roll tester 100 advantageously increases efficiency and accuracy of gear testing by eliminating need of human decisions. The device for measuring gear parameters with manual gear roll tester 100 is advantageously connectable with the gear roll tester 104. The device for measuring gear parameters with manual gear roll tester 100 is advantageously has two modes of operation i.e. automatic mode and manual mode.

The continuous monitoring module 254 of the device 100 advantageously monitors the device 100 during the automatic operation mode continuously. The displacement detection module 258 of the device 100 is advantageously configured to detect fluctuations in the probe 212 for detecting status of the device 100. The probe setting module 270 of the device for measuring gear parameters with manual gear roll tester 100 is advantageously configurable for tuning the probe 212 as per the requirement of the user. The dial 404 of the device 100 advantageously displays the dynamic range of a tested parameter of the testing gear.

The embodiments were chosen and described in order to best explain the principles of the present invention and its practical application, to thereby enable others, skilled in the art to best utilize the present invention and various embodiments with various modifications as are suited to the particular use contemplated.

It is understood that various omission and substitutions of equivalents are contemplated as circumstance may suggest or render expedient, but such are intended to cover the application or implementation without departing from the scope of the present invention.

The invention claimed is:

1. A device for measuring gear parameters with manual gear roll tester 100 removably connected to a gear roll tester 104 comprising:

a control unit 108 including a first processing unit 204 and a second processing unit configured for operating the device 100;

an input device 112 including a probe 212 configured for detecting gear meshing and producing relative deflection;

the first processing module 204 including a signal conditioner 228, an amplifier 232 and an interface module 236;

the second processing module 208 including a controller 250 configured for processing inputs, a continuous monitoring module 254 configured for dynamic operation, a displacement detection module 258 configured to detect fluctuations in the probe 212 for detecting status of the device 100, a database 262, a machine setting module 266 configured for using upper and lower value limit samples for determining center distance between gears, a probe setting module 270 configured for tuning the probe 212, a memory chip 274 and a random access memory (RAM) 276; and a first manual mode of operation, and a second automatic mode of operation for measuring and providing gear parameters.

2. The device for measuring gear parameters with manual gear roll tester 100 of claim 1 wherein, the first processing unit 204 configured for conditioning and amplifying input received from the input device 112.

3. The device for measuring gear parameters with manual gear roll tester 100 of claim 1 wherein, the second processing unit 208 configured for monitoring, processing inputs and displaying gear parameters, statistics and graphical analysis on an output device 116.

4. The device for measuring gear parameters with manual gear roll tester 100 of claim 1 wherein, the signal conditioner 228 is configured for converting probe 212 deflections into analogue signals.

5. The device for measuring gear parameters with manual gear roll tester 100 of claim 1 wherein, the amplifier 232 is configured to amplify the analogue signals.

6. The device for measuring gear parameters with manual gear roll tester 100 of claim 1 wherein, the interface module 236 configuring the signal conditioner 228 and the amplifier 232, and coordinating between the signal conditioner 228 and the amplifier 232.

7. The device for measuring gear parameters with manual gear roll tester 100 of claim 1 wherein, the continuous monitoring module 254 is configured for dynamic operation and continuous monitoring of the device 100.

8. The device for measuring gear parameters with manual gear roll tester 100 of claim 1 wherein, the machine setting module 266 is configured for determining center distance between the master gear and the testing gear.

9. The device for measuring gear parameters with manual gear roll tester 100 of claim 1 wherein, the probe setting module 270 is configured for tuning the probe 212.

10. The device for measuring gear parameters with manual gear roll tester 100 of claim 1 wherein, the output device 116 including a configured display 220 having a user interface 400 for graphically representing gear testing results and a speaker 224 for providing instructions to an operator.

11. The device for measuring gear parameters with manual gear roll tester 100 of claim 9 wherein, the user interface 400 including a dial 404 defined by a dynamic display displaying range of a gear parameter.

12. The device for measuring gear parameters with manual gear roll tester 100 of claim 7 wherein, the automatic mode including steps of:

a) Initiating the continuous monitoring module 254, b) Continuously monitoring and detecting displacement signals from the probe 212, c) Prompting user to start gear testing by producing visual and audio output, d) Starting testing cycle after receiving signals from the displacement detection module 258, e) Converting deflection into analogue signals and amplifying the signals, f) Processing the signals and calculating gear parameters, g) Displaying the parameters on the user interface 400, and h) Announcing decision of gear test.

13. The device for measuring gear parameters with manual gear roll tester 100 of claim 9 wherein, a process of configuring the probe 212 including steps of:

a) Positioning the probe 212 on a calibration stand, b) Mounting a lower value slip gauge on a mounting block 304, c) Opening probe scaling option in the probe setting module 270, d) Inputting reading value of the first slip gauge, e) Recording relative digital output of the first slip gauge by the probe setting module 270, f) Mounting a second slip gauge of higher vale on the mounting block 304, g) Inputting reading value of the second slip gauge, h) Recording relative digital output of the first second gauge by the probe setting module 270, i) Automatic deriving scaling factor for the probe 212 using the gauge inputs, j) Prompting the user to mount the probe 212 on the mounting block 304, k) Pre-loading the probe 212 according to the derived scaling factor.

* * * * *